US005923572A

United States Patent [19]

Pollock

[11] Patent Number: 5,923,572

[45] Date of Patent: Jul. 13, 1999

[54] FUEL DISPENSING CONTROL, AUTHORIZATION AND ACCOUNTING SYSTEM

[76] Inventor: Stephen F. Pollock, 3040 Carlow Cir., Tallahassee, Fla. 32308

[21] Appl. No.: 08/825,317

[22] Filed: Apr. 1, 1997

Related U.S. Application Data

[60] Provisional application No. 60/014,528, Apr. 2, 1996.

[51] Int. Cl.[6] ...................... G06F 19/00

[52] U.S. Cl. ...................... 364/528.17; 340/825.34; 141/94

[58] Field of Search ...................... 364/479.01, 479.02, 364/528.17, 528.18, 479.06, 479.08; 141/94, 351, 231; 340/825.34, 825.35

[56] References Cited

U.S. PATENT DOCUMENTS

| | | | |
|---|---|---|---|
| 3,814,148 | 6/1974 | Wostl . | |
| 4,263,945 | 4/1981 | Van Ness . | |
| 4,469,149 | 9/1984 | Walkey et al. . | |
| 4,846,233 | 7/1989 | Fockens . | |
| 4,934,419 | 6/1990 | Lamont et al. . | |
| 5,156,198 | 10/1992 | Hall . | |
| 5,204,819 | 4/1993 | Ryan . | |
| 5,359,522 | 10/1994 | Ryan . | |
| 5,605,182 | 2/1997 | Oberrecht et al. | 141/94 |

FOREIGN PATENT DOCUMENTS

| | | |
|---|---|---|
| 0040544 | 11/1981 | European Pat. Off. . |
| 2600318 | 12/1987 | France . |

*Primary Examiner*—Melanie A. Kemper
*Attorney, Agent, or Firm*—Dowell & Dowell, P.C.

[57] ABSTRACT

The disclosed system controls, authorizes and accounts for liquid petroleum fuel dispensed from liquid petroleum fuel dispensers without the need for control and authorization input from individuals performing the fueling. The system comprises a radio frequency identification tag mounted on the fuel nozzle, an automotive information module mounted in the vehicle, a fuel island-mounted fuel management unit and on-site or remotely-located software which provides the system owner with fuel usage and invoicing reports.

13 Claims, 5 Drawing Sheets

FUEL DISPENSING CONTROL, AUTHORIZATION AND ACCOUNTING SYSTEM

CROSS REFERENCE TO RELATED APPLICATION

This application is related to provisional application Ser. No. 60/014,528 filed on Apr. 2, 1996. It is requested that the provisional file be merged with this application.

BACKGROUND OF THE INVENTION

1. Field of the Invention

The invention is related to the field of fuel dispensing and, more particularly, to a fuel dispensing system suitable for controlling, authorizing and accounting for liquid dispensed from liquid petroleum fuel dispensers without requiring control and authorization input from individuals performing the fueling.

2. History of the Related Art

Solid state microcontroller-based fuel control and accounting systems have been commercially available since the early 1980s. The known systems have incorporated many methods of accessing and transferring authorization data, including read-only electronic keys, read/write electronic keys, keypad entry, read-only radio frequency ("RF") identification ("ID") tags, read/write RF/ID tags, magnetic stripe cards, bar code readers and inductive coil antennae. Systems providing these means of data access are presently available from a large number of commercial companies.

Each of the known systems has disadvantages. The one common disadvantage of most of the systems is the inability to automatically positively identify the vehicle being fueled. In that the systems require some operator input, the operator input can produce fuel control and accounting errors. Although the known systems have reduced the chance of operator error, each has generated a major disadvantage in the process. The inductive coil antennae pair reduces possible operator errors; however, this system requires a communication wire be affixed to the fueling hose so that communications can be accomplished via an inductive coil antennae pair mounted on the fuel nozzle and on the vehicle's filler neck.

Two types of RF/ID tags exist: short-range and long-range varieties. Short-range RF/ID Tags have very short-range operational characteristics that assure that only one RF/ID Tag responds to a reader's interrogation. However, when long-range RF/ID Tags are used for fueling, all RF/ID Tags within range of a reader respond to that reader's interrogation. This response characteristic dictates that a secondary source of information is required in order to ascertain with which vehicle the long-range RF/ID Tags is associated. This operational characteristic presents a major problem for RF/ID Tag associated fueling scenarios.

U.S. Pat. No. 4,253,945 to Van Ness discloses an automatic control system for dispensing fuel to vehicles. The system comprises a fuel control transmitter attached to a vehicle and a receiver unit attached to a fuel dispenser. This system provides no positive assurance that the dispenser's fuel nozzle is actually installed in the vehicle to which the fuel control transmitter is affixed. Also, no memory is provided in the receiver units, requiring each receiver unit to be on-line with a computer configured with logic and memory capabilities. Further, a receiver unit must be attached to each dispenser and each receiver must be on-line with the computer.

U.S. Pat. No. 5,204,819 to Ryan discloses an apparatus for authorizing the delivery of fuel to a vehicle from a fuel delivery device. The apparatus comprises an unpowered RF/ID tag associated with a vehicle, and a second device associated with the fuel delivery device which reads the RF/ID tag, authorizes and controls fuel delivery. This system's unpowered RF/ID tag lacks the capability to directly monitor and accrue the vehicle's mileage. In order to monitor and accrue the vehicle's mileage, the vehicle would require an on-board computer configured for these tasks, and for transfer of the accrued vehicle's mileage to the unpowered RF/ID tag for subsequent transfer to the second device. The second device's location on the fuel nozzle requires recharging of the second device's batteries, and/or electrical wires running along/or in the fuel hose for a supply of the recharge power. The second device would be required to control the flow of fuel through direct valving in the nozzle, to monitor the quantity of fuel dispensed through a pulser mounted in the fuel nozzle, and to be intrinsically safe in accordance with requirements as defined by ANSI/UL 913 (for example, current limited and extremely low power). For the second device to be capable of RF communications with a remote location, further power would be required from this second device and this further burdens the technical feasibility of meeting the intrinsic safety driven power limitations of the second device.

U.S. Pat. No. 5,359,522 to Ryan discloses an apparatus for two-way communications between a vehicle and a fuel delivery device. The apparatus comprises a first two-way communications device associated with a fuel delivery device, and a second two-way communications device associated with a vehicle. This apparatus has increased communicative abilities between the vehicle associated device and the fuel delivery associated device relative to the system of U.S. Pat. No. 5,204,819. The device locations on the fuel nozzle and on the vehicle are as disclosed in U.S. Pat. No. 5,204,819. However, the increased communicative disclosures further burden the technical feasibility of meeting intrinsic safety driven power limitations relative to the safety requirements as defined by ANSI/UL 913.

Thus, there is a need for a system which, when integrated into the multiplicity of technical data transfer requirements, eliminates the need for operator input and, accordingly, eliminates operator error.

SUMMARY OF THE INVENTION

The present invention satisfies the above-described need and provides a fuel dispensing system in which all operator input to the fueling process is eliminated. The operator need only remove the fuel nozzle from the fuel dispenser, insert the nozzle into the filler neck of the vehicle's fuel tank and dispense fuel. All fuel authorization and transaction data is autonomously collected and stored until transferred to software located on-site or a remote location for processing into fueling reports and invoices.

The fuel dispensing control, authorization and accounting system in accordance with a preferred embodiment of the invention comprises: a liquid petroleum fuel nozzle-mounted RF/ID tag; a vehicle-mounted automotive information module; a fuel management unit for installing at a fuel island of a fuel supply source, typically a gas station; and, software, typically loaded on an IBM PC compatible clone in the fuel station owner's management office, located at the fuel supply source or at a remote location.

An RF/ID tag is preferably mounted on each fuel dispenser nozzle of the fuel supply source. The RF/ID tag has a specific ID known by the fuel management unit (herein the "FMU") and related to the fuel dispenser nozzle. Upon insertion of the fuel dispenser nozzle into the vehicle's fuel filler neck, the automotive information module (herein the "AIM") microcontroller and RF/ID tag interrogation circuitry and antennae read (interrogate) the RF/ID tag. The RF/ID tag's specific ID, AIM stored data (including at least the following: vehicle ID; fuel supply source signature, herein "site signature"; fuel types; and quantity limits) and the current vehicle mileage are then transmitted by the AIM to the FMU via the AIM's RF transmitter. The FMU then correlates the received data with the FMU's internally-stored RF/ID tag and fuel dispensing hose correlation data with the FMU's lock-in and lock-out data and, if the data meets all acceptance criteria, the FMU allows the fuel dispenser to dispense fuel.

The RF/ID tag can be specially designed or a commercially available read-only or read-write short-range tag. The RF/ID tag's short-range is an important advantage with respect to overall system functionality, in that only when the fuel nozzle is inserted into the vehicle's filler neck is the RF/ID tag within range of the vehicle's AIM RF/ID tag antennae. Accordingly, only under conditions for fueling, can the RF/ID tag be read or interrogated so that fueling authorization can occur.

The RF/ID tag and the AIM antennae positional relationship also enables continuous security checking of the positional relationship, thereby allowing the FMU to terminate fueling once the nozzle is removed from the filler neck.

The AIM achieves the four functional tasks of reading (interrogation) of the RF/ID tag, the RF transmission of data (including at least the following: RF/ID tag ID, vehicle specific data and current vehicle mileage), interfacing with the vehicle's speedometer/odometer, and counting/recording of odometer information (pulses equating to vehicle mileage reading), and the programming, processing, logic, and management thereof.

The reading of the RF/ID tag is accomplished via the AIM's microcontroller, RF/ID tag interrogation circuitry and antennae. This reading is accomplished upon initial insertion of the nozzle into the filler neck and, after initial insertion, at continual intervals until the nozzle is removed. By this method, the AIM continuously monitors the presence of the RF/ID tag.

The interface with the vehicle's speedometer/odometer can be accomplished by the AIM via direct monitoring of the vehicle's electronic speedometer/odometer circuitry, inclusion of and subsequent monitoring of a transducer in the vehicle's mechanical speedometer/odometer drive cable, or inclusion of and subsequent monitoring of an inductive pickup on the vehicle's drive shaft.

The processing, logic, and management of functional tasks of the AIM is accomplished by the AIM's on-board microcontroller. The microcontroller provides for the storage of fuel supply source and vehicle specific data, storage and processing of vehicle gathered data such as a mileage related pulse count, processing of the data types for RF transmission, and the execution of programmable logic.

The microcontroller allows the AIM to receive vehicle specific data from an external source, recognize the presence of the RF/ID tag and transmit data appropriate to its presence or non-presence, and control its own startup and shutdown sequences.

The AIM uses RF transmission to transfer data including RF/ID tag specific data, vehicle and fuel supply source specific data, and vehicle gathered data to the FMU, where the data types can be compared with the FMU's stored lock-in and lock-out data lists so that authorization of fuel delivery can be undertaken.

The FMU authorizes fueling operations via direct control of non-electronic fuel dispensers or via serial or other industry standard communications with electronic fuel dispensers. Upon fueling authorization, the FMU monitors fueling operations for pulse count (equating to fuel quantity dispensed) and fueling completion. Upon the fueling completion or upon reaching maximum quantity limits, the FMU terminates the fueling operation via control over the fuel dispensers and records a transaction. The transaction includes at least the following information: data received via RF transmission from the AIM; fuel quantity information (acquired from pulses equating to fuel quantity dispensed); and the FMU configured data to include at least the time, date, fuel type and hose number.

It is an object of the present invention to provide a liquid fuels delivery system which denies the issuance of fuel if the liquid fuel nozzle is not within the receiving range of available short-range communications and data transfer devices. This feature combined with the feature that all RF/ID tag data, AIM specific data, and FMU stored data be correct defines which vehicle(s) receive(s) fuel, thereby alleviating the two most common fuel control and accounting system errors of human error and theft.

It is another object of the present invention to provide a liquid fuels delivery system which comprises means to reduce the required operator input to a minimum. This feature significantly reduces operator training and educational requirements. This results in a cost saving to fuel control and accounting system's customers in addition to those normally associated with fuel conservation, security and efficient accounting practices.

It is yet another object of the present invention to provide a system adaptable to all forms of substance transfer. The invention can be used for dispensing all forms of liquids, gases and solids which are dispensed via a hose, chute, and/or nozzle.

A further object of the present invention is the incorporation of both a site dependent and hose dependent digital code encrypted into the AIM and the RF/ID tag, respectively. Via this means of fuel authorization, RF conflicts and data conflicts between hoses, sites, and transactions are eliminated, thereby eliminating potential errors which could otherwise occur when multiple fueling operations are occurring simultaneously at different hoses located at either the same or different fueling sites within the RF reception range of a given RF transceiver set.

A still further object of the present invention is the incorporation of a powerful microcontroller-based computer into the FMU to allow the system to interface with future technologies as they become commercially available. For example, 2-D bar coding, advanced versions of RF/ID tags, and governmental requirements for technical implementations of standards are expected in the near future. Due to the system's flexibility, it is contemplated that these products and technical implementations of standards can be instituted within the capabilities of the invention.

Another object of the present invention is the enhancement of existing fuel control and accounting systems. Existing systems have positive features which are responsible for their widespread acceptance and use. Positive features include the ability to: provide security at a fueling site without requiring an on-site attendant; accurately monitor the use of fuel; issue reports for fuel usage; and issue invoices for the use of fuel. The known systems have also, however, had problems associated with operator input errors and fuel theft by individuals with authorized access to the fueling site (for example, individuals having codes, keys, or cards for an authorized vehicle enabling system access to fuel an unauthorized vehicle). The present invention can be installed in new or existing fuel control and accounting systems, to negate the negative features as well as any potential customer reluctance to purchase fuel control and accounting systems for use at fueling sites.

DETAILED DESCRIPTION OF PREFERRED EMBODIMENT

Figure 1:
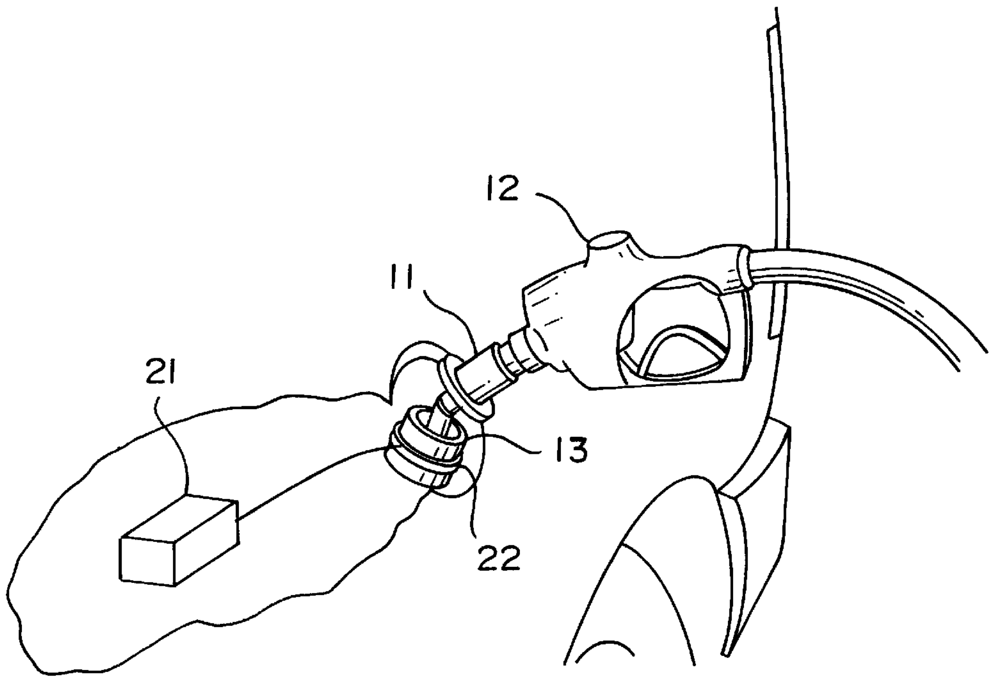
FIG. 1 depicts a fuel nozzle with an RF/ID tag affixed in the fuel nozzle's splash guard, and a loop antennae which comprises an element of the automotive information module's RF/ID tag interrogation circuitry, attached around the vehicle's fuel tank filler neck, the flow of RF/ID tag data being from the RF/ID tag to the loop antennae.
Figure 2:
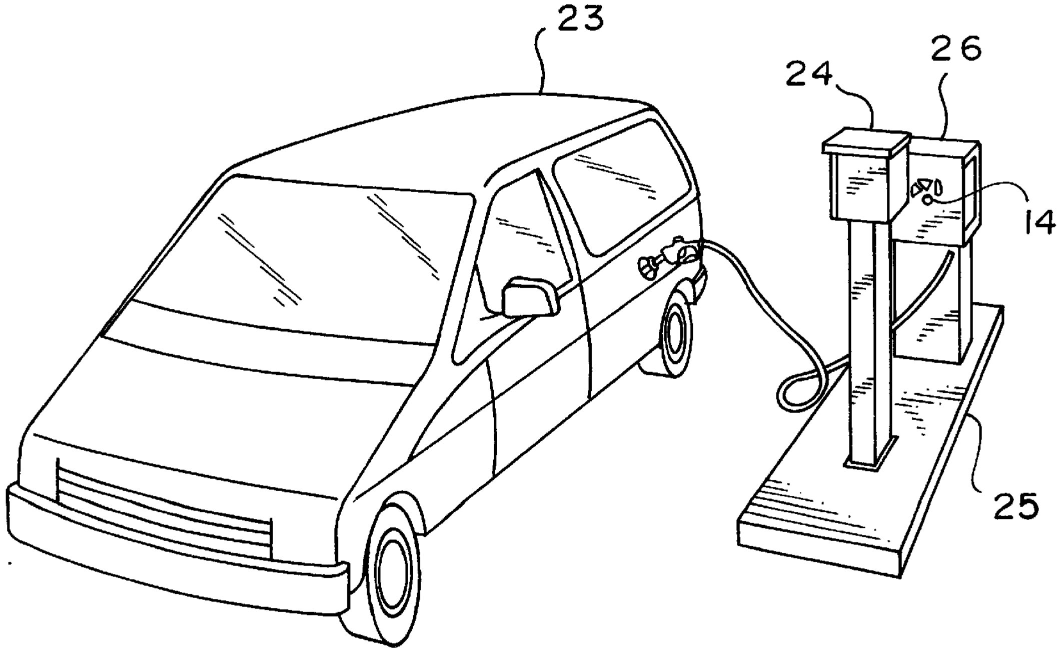
FIG. 2 depicts a vehicle with an installed automotive information module, fuel dispenser and a fuel island-mounted fuel management unit in accordance with the invention.

Referring to FIGS. 1 and 2, the fuel dispensing control, authorization and accounting system in accordance with a preferred embodiment of the invention comprises an RF/ID tag 11 molded into a splash guard on a liquid fuel nozzle 12, a microcontroller-based automotive information module (herein "AIM") 21 mounted within a vehicle and an associated loop antenna 22 mounted around the fuel filler neck 13, and a fuel management unit (herein "FMU") 24 mounted on a fuel island 25 with a fuel dispenser 26. The fuel island is typically one of a plurality of fuel dispensers provided at a fuel supply source.

In operation, the operator removes the fuel nozzle 12 from the fuel dispenser 26, moves the fuel dispenser's reset handle 14 to the fueling position, inserts the fuel nozzle 12 into the filler neck 13 of the vehicle's fuel tank, and dispenses fuel. In many cases, the reset handle need not be moved to the fuel position due to the design of the particular fuel dispenser.

The above described fueling procedure is identical to that normally followed when a fueling site does not include the system in accordance with the present invention. This is because the present invention transfers, automatically and without the knowledge of the operator, the vehicle 23 and RF/ID tag 11 related data from the AIM 21 to the FMU 24, and the FMU 24 automatically authorizes the fueling sequence by allowing the fuel dispenser 26 to be activated, and commences to monitor and record the fueling sequence as a fuel transaction. At the completion of the fueling, the FMU 24 automatically terminates the transaction and records the transmitted data for further processing. For example, the further processing may include transfer to off-site, remotely-located software for record keeping, invoice processing purposes.

In greater detail, the operation of the preferred embodiment of the system in accordance with the invention is as follows. The operation includes the following prerequisite installation conditions:

a) each vehicle to be fueled is physically equipped with an AIM 21 and an associated antenna 22;

b) the fuel island is physically equipped with an FMU 24;

c) preferably each nozzle 12 on the fuel island 25 is physically equipped with an RF/ID tag 11;

d) configuration and reporting software is loaded on a computer which is preferably a PC compatible clone located either on-site or at remote location;

e) each AIM 21 is configured with the correct site signature, vehicle ID, fuel type and quantity limits, pulse to mileage ratio, initial odometer reading, and other pertinent information;

f) each FMU 24 is configured with the correct site signature, RF/ID tag ID to hose correlation, lock-out and lock-in data lists, and other pertinent information; and g) all data bases are properly built within the configuration and reporting software, and the software is in communication with the FMU 24 to enable the downloading of lock-out and lock-in data lists and the uploading of fuel transaction lists.

After these prerequisites are completed, the present invention is operational for the autonomous control, authorization, and accounting of liquid petroleum products.

During normal vehicle operation, the AIM 21 continuously records vehicle miles as accrued. Upon stopping, for example, at the fuel station, the AIM 21 microcontroller determines that the vehicle is stopped (power must be available), and the AIM 21 uses RF/ID tag interrogation circuitry to search for an RF/ID tag 11.

If an RF/ID tag is not found, the AIM 21 continues to search for a finite period of time and then stops searching. If an RF/ID tag is found, the AIM 21 combines the RF/ID tag identification number with the AIM's 21 internally-stored vehicle specific data, fueling supply source specific data, the current vehicle mileage data, and error detection data. The combined data is transmitted a finite number of times using a varying time interval between transmissions. The AIM 21 continues, at a finite time interval, to search for an RF/ID tag 11. If an RF/ID tag 11 is found, the AIM 21, via its RF transmitter circuitry, transmits a reduced data string containing sufficient data for the FMU 24 to determine that the nozzle 12 is still inserted into the vehicle's filler neck 13. If an RF/ID tag 11 is not found after a finite period of time, the AIM 21 terminates both searching for, and transmitting acknowledgment of, the RF/ID tag's 11 presence and sends a terminate fueling message to the FMU 24.

Cycling of the vehicle's power causes the AIM 21 to re-initiate the pulse count equating to mileage and/or the RF/ID tag 11 interrogation sequence.

During normal operations, the FMU 24 continuously listens via its RF receiver circuitry, for a transmission from the AIM 21. Upon receiving a transmission from the AIM 21, the FMU 24 checks the received data against the FMU's 24 internally-stored data, including fueling site signature, vehicle lock-out and lock-in data lists, RF/ID tag 11 to fuel dispensing hose number correlation list and fuel type selected versus allowable fuel data. If all selection criteria is correct, the FMU 24 checks that the pump handle is turned on, initiates a transaction, turns on the appropriate fuel dispenser hose, counts pulses equating to fuel quantity dispensed, and monitors RF reception for continuing data from the AIM 21 indicating the nozzle 12 is still inserted into the vehicle's filler neck 13.

The FMU 24 terminates the fueling sequence upon a failure to receive the continuing data from the AIM 21, and the pump handle is returned to the off position. Receiving a terminate fueling message from the AIM 21, the internally programmed FMU 24 timers reach programmed limits, and/or reach the quantity limits defined by the vehicle's data string.

Upon termination of the fueling sequence, the FMU 24 logs a transaction record within its memory.

If all selection criteria is not correct, no fuel is dispensed.

Additionally, the FMU 24 can, independently of and/or concurrently with the fueling operations, communicate with other FMUs, referred to herein as "satellite FMUs, and communicate with the remotely-located software. For example, the communications with the software comprises a fuel transaction data transfer to the software for the purpose of accounting, processing, invoicing, and a transfer of updated lock-out and lock-in data to the FMU 24.

The above-described operational scenario is an outline of the actual code used to generate this sequence of events. Operation of the present invention is, however, autonomous and conducted without participation by the individuals using the fuel facilities.

Figure 4:
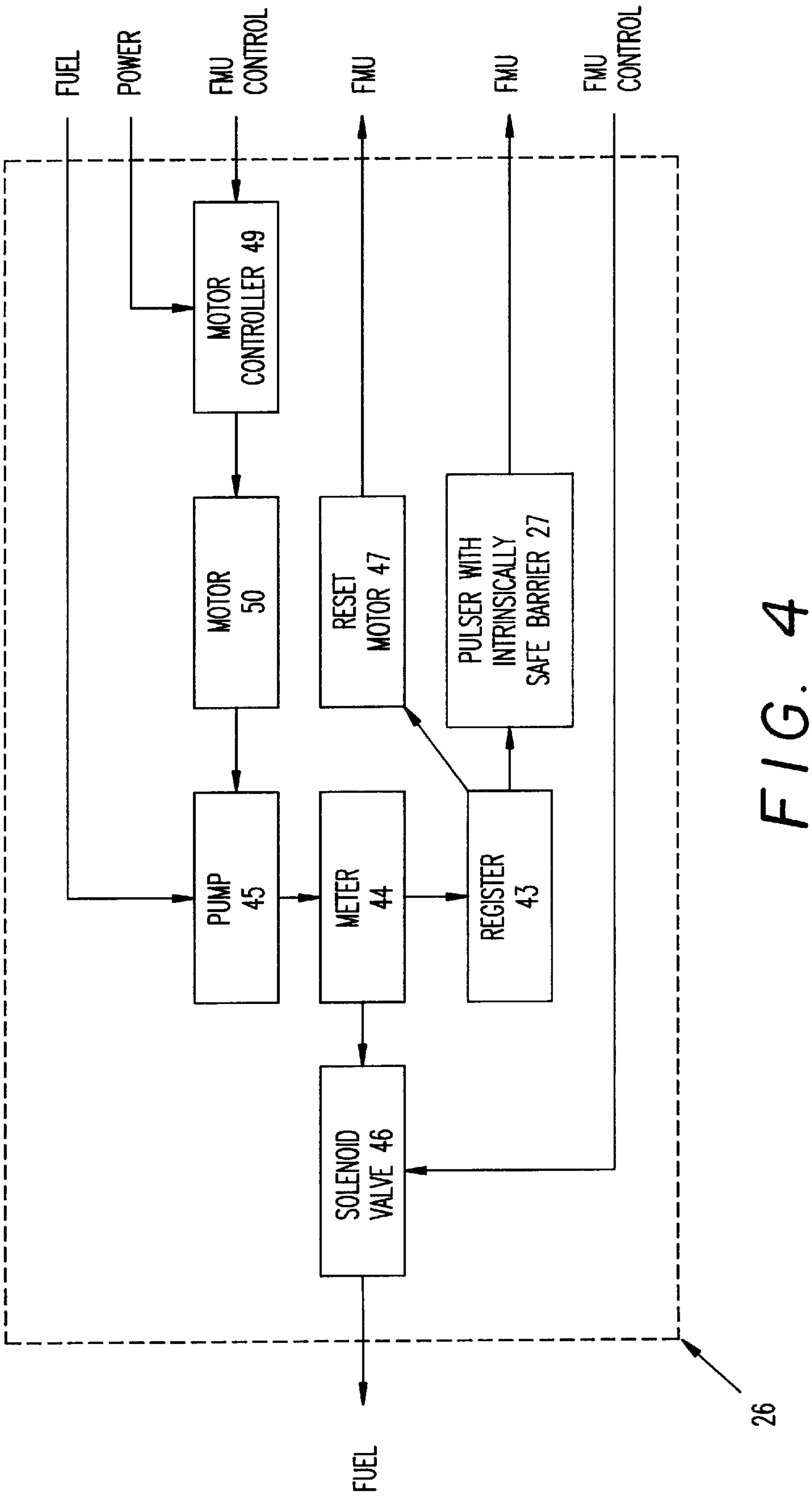
FIG. 4 is a flow diagram illustrating the interconnection and the flow of control and data within a generic single hose fuel dispenser containing both an internal pump and its associated motor.

There are numerous types and variations of commercial fuel dispensers 26 currently available. FIG. 4 depicts a generic dispenser comprising a motor 50, a motor controller 49 and a solenoid valve 46. The FMU 24 is configured to interface with different types and variations of dispensers including, for example, a fuel dispenser 26 with only a motor 50, wherein the FMU 24 controls the motor 50 directly; a fuel dispenser 26 with both a motor 50 and a motor controller 49, wherein the FMU 24 controls the motor controller 49; a fuel dispenser 26 with a solenoid valve 46 located in the fuel line, both with or without a motor 50 and/or a motor controller 49, wherein the FMU 24 controls the solenoid valve 46; and a fuel dispenser 26 equipped with a microcontroller-based control unit, wherein the FMU 24 is configurable to communicate serially with the fuel dispenser's 26 microcontroller.

The generic fuel dispenser 26 shown in FIG. 4 comprises the motor controller 49 which controls the motor 50 which in turn drives the pump 45, and the pump 45 drives fuel through a meter 44 through the solenoid valve 46 and to the fuel nozzle 12 such as shown in FIG. 1. A register 43 displays the amount of fuel that passes through the meter 44 and turns a pulser 27 so that the pulser's output is also proportional to the fuel passing through the meter 44. Upon power application to the motor controller 49 and the motor 50, indirectly or directly, a reset motor 47 sets the register 43 to zero and allows the motor 50 or the solenoid valve 46 to be activated, thereby allowing dispensing of fuel. Within the mechanics of the reset motor 47 is a reset handle such as the reset handle 14 of FIG. 1, the FMU 24 monitors the reset handle's position to determine fueling completion.

Figure 3:
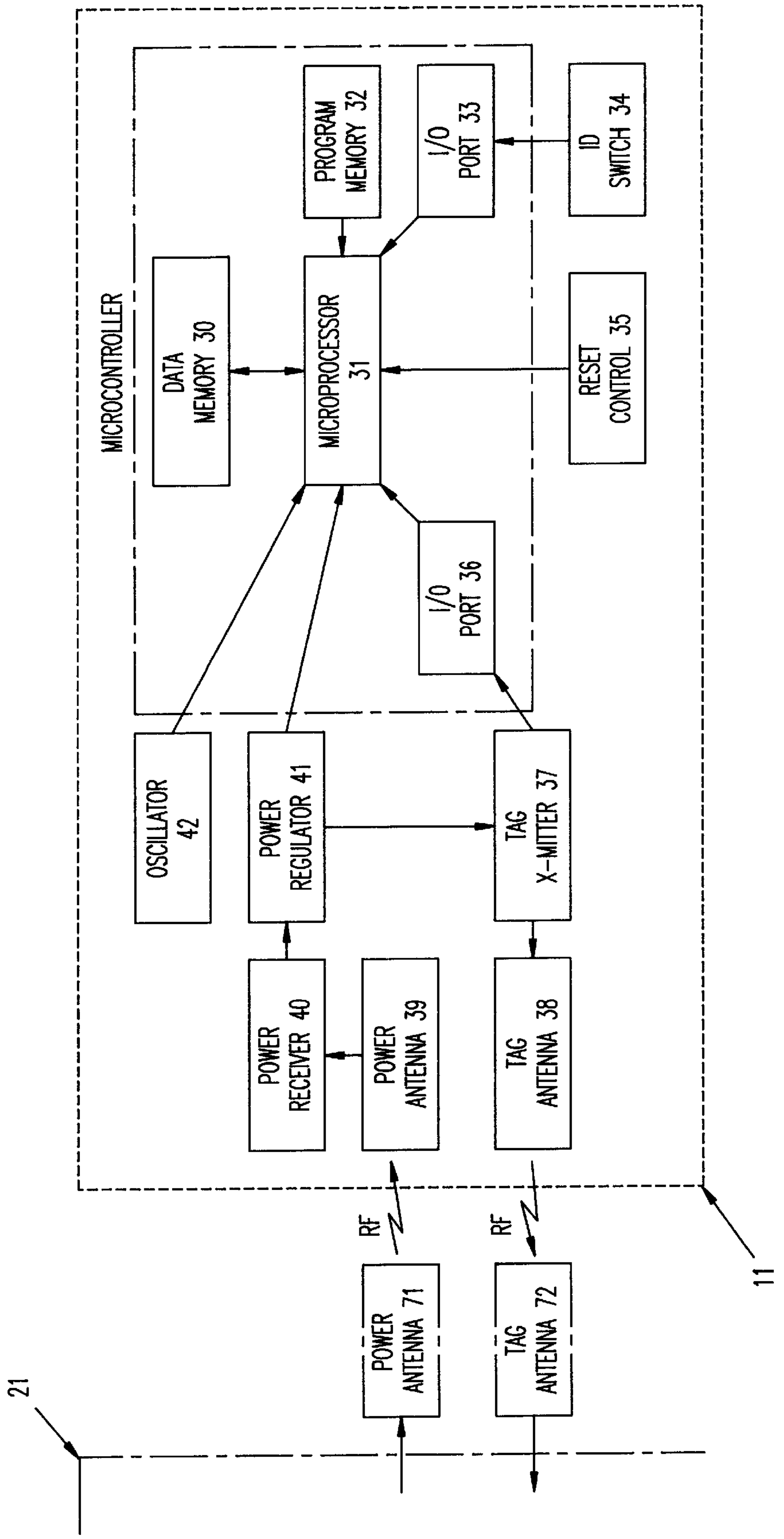
FIG. 3 is a flow diagram illustrating the interconnection and the flow of control and data within an RF/ID tag in accordance with the invention.

Referring to FIG. 3, the microprocessor 31 based RF/ID tag 11 in accordance with the invention incorporates receiver circuitry, transmitter circuitry, and program logic into the nozzle 12 mounted package resembling and substituting for a fuel nozzle's splash guard. The receiver circuitry comprises a power antenna 39, a power receiver 40 and a power regulator 41. The transmitter circuitry comprises a tag antenna 38, a tag transmitter 37 and an I/O port 36. The program logic comprises a data memory 30, a program memory 32, a reset control 35, an oscillator 42 and an ID switch 34 with an associated I/O port 33.

The RF/ID tag 11 operates as follows. The power regulator 41 circuitry absorbs RF energy transmitted by the AIM 21. The RF energy is received via the power antenna 39 and the power receiver 40. When the absorbed energy reaches a predetermined value, voltage is applied to the microprocessor 31, wherein the microprocessor 31 executes a short program received from the program memory 32. The short program includes interrogation of the ID switch 34, and the transmission of the interrogation data via the tag transmitter 37 and the tag antenna 38. The microprocessor 31 then goes into sleep mode awaiting another transmission of RF energy by the AIM 21.

Figure 5:
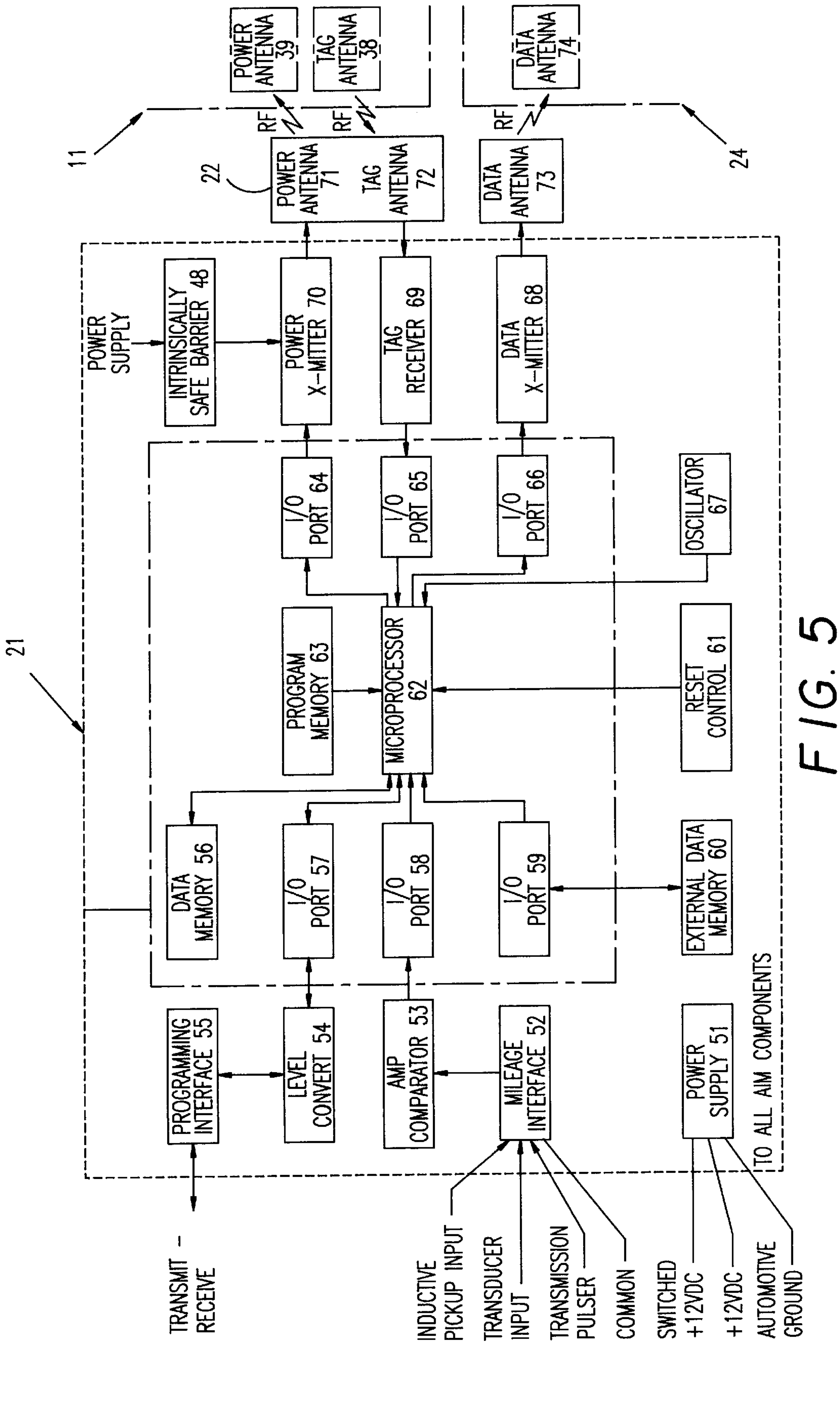
FIG. 5 is a flow diagram illustrating the interconnections and the flow of control and data within an automotive information module in accordance with the invention.

Referring to FIG. 5, the microprocessor 62 based AIM 21 in accordance with the invention incorporates RF transmit/receiver circuitry, vehicle interface circuitry, and program logic into a vehicle-mounted package. The RF transmit/receiver circuitry comprises a power antenna 71, a tag antenna 72, a data antenna 73, a power transmitter 70, a tag receiver 69, a data transmitter 68, associated I/O ports 64, 65, 66, and an intrinsically safe barrier 48. Safety requirements in and around fuel areas are driven by NFPA requirements (National Fire Protection Association) and the intrinsically safe barrier complies with these requirements. The NFPA's intrinsic safety requirements are defined by ANSI/UL 913 (Underwriters Laboratories, Inc.). The vehicle interface circuitry comprises a mileage interface 52 and an associated amplifier and comparator 53 and I/O port 58, and a power supply 51. The program logic comprises a data memory 56, a program memory 63, a reset control 61, an oscillator 42, an external data memory 60 and an associated I/O port 59, and a programming interface 55 having an associated level convert 54 and I/O port 57.

The AIM 21 operates as follows. The power supply 51 receives power from the vehicle, and converts and distributes the power to all required AIM 21 components. The mileage interface 52 monitors vehicle mileage. The vehicle mileage is monitored via a sine wave or a pulse count passed through the amplifier and comparator 53 to the I/O port 58 and to the microprocessor 62. The microprocessor 62 counts pulses (a sine wave input is converted to pulses by the amplifier and comparator 53), adds same to the existing mileage count, and then stores the new mileage count in the data memory 56. This mileage update process is carried on continuously as the vehicle generates mileage pulses as it moves.

The programming interface 55 allows an external computer (for example, a PC clone, laptop or notebook based computer) to initialize and input vehicle specific data. The data includes, for example, fueling site ID, vehicle ID, fuel type and quantity limitations, initial mileage and pulse count to mileage conversion, and is stored in the external data memory 60. Upon each power-up, the microprocessor 62 reads the data from the external data memory 60 and stores same in the data memory 56 for instant access during program operation. The programming interface 55 transfers data to and from the microprocessor 62 via the I/O port 57 and the level convert 54.

The AIM 21 includes three RF communications means. These means are power transmission to the RF/ID tag 11, reception of RF/ID tag ID information from the RF/ID tag 11, and transmission of RF/ID tag ID and vehicle specific data to the FMU 24.

Power transmission to the RF/ID tag 11 is via the microprocessor 62 sending a transmit signal via the associated I/O port 64 to the power transmitter 70 and to the power antenna 71. The power antenna 70 is driven by the intrinsically safe barrier 48. The program logic for sending the transmit signal originates in the program memory 63. The program logic looks for the pulse count to stop, due to the vehicle stopping, and a programmable time period to elapse, or the vehicle's ignition to be turned off. The program logic discontinues the transmit signal upon completion of fueling, removal of the nozzle 12 from the filler neck 13, or after a programmable time period elapses without the reception of RF/ID tag 11 data.

The reception of the RF/ID tag ID information from the RF/ID tag 11 is accomplished via the microprocessor 62 receiving data via the associated I/O port 65 from the tag receiver 69 and the tag antenna 73. Upon reception and successful error checking, the RF/IF tag data is stored in the data memory 56, and the AIM 21 proceeds with its third RF communications means, transmission of RF/ID tag ID information and vehicle specific data to the FMU 24.

The transmission of RF/ID tag ID and vehicle specific data to the FMU 24 is via the microprocessor 62 receiving vehicle specific data (for example, site ID, vehicle ID, fuel type and quantity limitations, and current mileage) and RF/ID tag ID information from the data memory 56 and sending same to the data antenna 73 via the data transmitter 68 and the I/O port 66. The transmission of data by the data antenna 73 is also programmable with respect to the speed, frequency of transmissions, and number of repetitions.

The microprocessor 62 via the program memory 63 is programmed to continue interrogating the RF/ID tag 11 via the power transmission circuitry and the reception of RF/ID tag ID circuitry, and if the RF/ID tag 11 does not respond to the interrogation, the microprocessor 62 initiates the transmission of a discontinue fueling code to the FMU 24 to ensure that fueling is discontinued if the fuel nozzle 12 is removed from the vehicle's filler neck 13.

Figure 6:
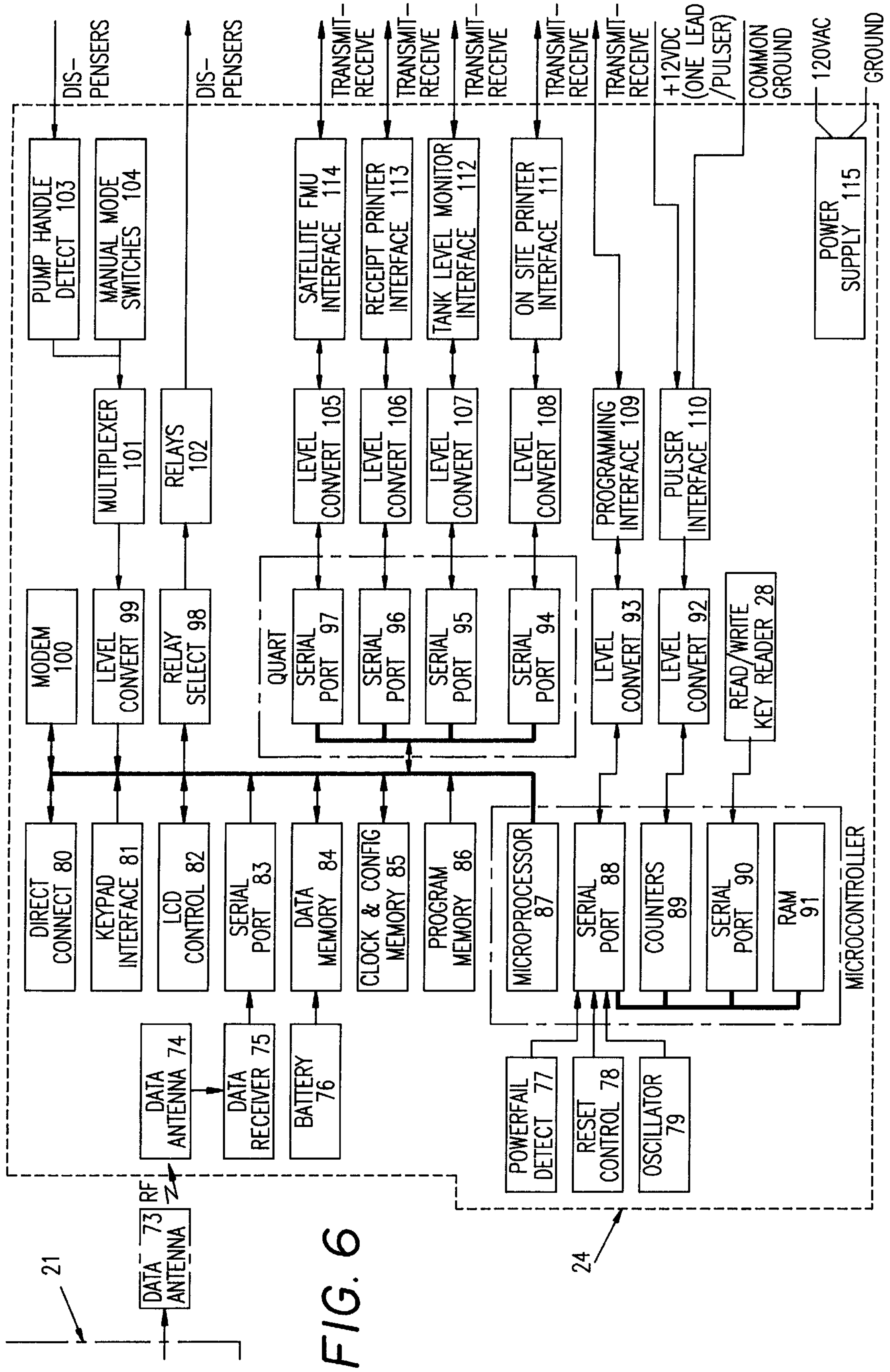
FIG. 6 is a flow diagram illustrating the interconnections and the flow of control and data within a fuel island-mounted fuel management unit in accordance with the invention.

Referring to FIG. 6, the microprocessor 87 based FMU 24 incorporates RF receiver circuitry, fuel dispenser interface circuitry, operator interface circuitry, peripheral equipment interface circuitry, and a remote communications interface and program logic, into a fuel island 24 mounted package.

The RF transmit/receiver circuitry comprises a data antenna 74, a data receiver 75, a data antenna 73 and a serial port 83.

The fuel dispenser interface circuitry comprises a pulser interface 110, a level convert 92, counters 89, a pump handle detect 103, manual mode switches 104, a multiplexer 101, a level convert 99, relays 102 and a relay select 98.

The optional operator interface circuitry comprises a keypad interface 81, an LCD control 82, and an electronic read/write key reader 28.

The peripheral equipment interface circuitry comprises a satellite FMU interface 114, a receipt printer interface 113, a tank level monitor interface 112, an on-site printer interface 111, level converts 105–108 and serial ports 94–97.

The remote communications interface comprises a modem 100 and a direct connect 80.

The program logic comprises a data memory 84, a program memory 86, a reset control 78, an oscillator 79, a powerfail detect 77, a clock and configuration memory 85, a battery 76, and a programming interface 109 with an associated level convert 92 and serial port 89.

In operation, the FMU 24 receives RF data from the AIM 21 via the data antenna 73, data receiver 75 and serial port 83. The received data is stored in the data memory 84 and portions of the received data are compared with authorization data also stored in the data memory 84. Upon successful verification that the fueling site signature, the vehicle ID, the RF/ID tag ID and the fuel type of the received data matches the authorization data and the hose is available, the microprocessor 87 allows the fuel dispensing hose matching the RF/ID tag ID to dispense fuel.

The process to allow the hose matching the RF/ID tag ID to dispense fuel is as follows. The microprocessor 87 programs a maximum pulse count which matches the fuel quantity limit for the vehicle so that the transaction is terminated upon reaching the fuel quantity limit. The microprocessor 87 activates a relay equating to the hose selected via the relay select 98 and relays 102, and monitors the position of the selected pump handle via the pump handle detect 103, the multiplexer 101 and the level convert 99. The microprocessor 97 commences counting pulses from the selected hose's pulser via the counters 89, the level convert 92 and the pulser interface 110 (the selected hose being the hose equating to the RF/ID Tag ID), and monitors the pulses for fueling rate. If the pump handle is turned off, indicating a completed fueling sequence, and/or the pulse rate drops to zero for a programmable amount of time, and/or the programmed maximum pulse count is reached, the microprocessor 87 terminates the fueling sequence by turning off the relay associated with the selected hose via the relay select 98 and the relays 102. The microprocessor 97 records the fueling sequence as a transaction in the data memory 84. The fueling transaction includes at least the vehicle ID, current vehicle mileage, fuel quantity, time and data and fuel type.

The present invention includes an optional fuel accounting system based on an electronic read/write key activated system whereby the user and/or each vehicle is issued the electronic read/write key, and with the electronic read/write key, a user has access to fuel. These electronic read/write keys have the necessary coded data, for example, to define vehicle/user ID, key number, allowable fuel types and quantity limits, vehicle mileage, mileage reasonability checks, and preventative maintenance flags. This optional fuel accounting scenario provides a system with all necessary security, control and accounting requirements for an unmanned fueling facility. As such, the present invention's operator interface comprises a keypad interface 81, an LCD control 82, and a electronic read/write key reader 28. The read/write key reader 28 accesses the microprocessor 87 via a serial port 90. The optional interface and operating firmware and software allow the present invention to operate with either electronic read/write keys or with automotive information module equipped vehicles.

The FMU 24 is configured to provide an interface with peripheral items. The peripheral items include a satellite FMU interface 114, a receipt printer interface 113, a tank level monitor interface 112 and an on-site printer interface 111. The peripheral items are controlled by the microcontroller via the serial ports 94–97 and the level converts 105–108. These features allow users to receive a receipt for an individual transaction, the station operators to receive a complete print-out of all transactions and system functions, and the remote software operators to receive reports from tank level monitors via their normal interface with the FMU 24. The normal interface between the FMU 24 and the remote software, which usually is on a PC clone, is via modem and/or direct connect (for example, RS422/RS232 as defined by ANSI/EIA Standard; Electronic Industries Association). The tank level monitor reports are in addition to all fuel accounting and invoicing functions offered in the software package. The normal interface is accomplished by the FMU 24 via the modem 100 or the direct connect 80.

The FMU 24 has the provisions to communicate with satellite FMUs via RS422 serial communications. The satellite FMUs do not comprise a tank level monitor interface 112, an on-site printer interface 111, a modem 100 or a direct connect 80. These features are accomplished by the FMU 24. When the FMU 24 is configured for communications with the satellite FMUs, the FMU 24 is referred to as the "master FMU".

Communications with the FMU 24 can be accomplished via the modem 100, the direct connect 80 or the programming interface 109. The normal communications methods employed by the operators of the remote accounting and invoicing program are via the modem 100 or the direct connect 80. The FMU 24 can be accessed via the programming interface 109 with the associated level convert 92 and serial port 89, to allow on-site trouble shooting of the FMU 24 via an external computer such as a PC laptop or a notebook.

Upon application of power, the FMU's 24 power supply 115 monitors the line voltage to ensure that it is within prescribed limits and that the voltage is stable within the limits. Upon meeting the prescribed limits, voltage is then passed on to the FMU 24. Upon receiving power, the microprocessor 87 completes an initialization process. The initialization process, as with the FMU's 24 operational code, is read from the program memory 86, and the clock and configuration memory 85. If the line voltage become unstable, the powerfail detect 77 issues a signal to the microprocessor 87, and the microprocessor 87 terminates any fueling transactions, stores the transactions in the data memory 84, shuts down all operating functions, and awaits the re-application of power by the power supply 115.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A fuel dispensing control, authorization and accounting system which operates without requiring control and authorization input from an individual during the fueling of a vehicle at a fuel supply source, the fuel supply source including at least one fuel dispenser, each fuel dispenser including a fuel dispensing hose and an attached fuel nozzle, and the vehicle having a fuel filler neck of a size to receive a fuel nozzle, the system comprising:

a) a microcontroller-based fuel management unit means adapted to be operatively connected to the fuel supply source for controlling fuel dispensing from the at least one fuel dispenser;

b) a microcontroller-based automotive information module means adapted to be mounted to a vehicle for acquiring, processing, storing and transmitting vehicle specific identification data;

c) a passive RF identification tag means adapted to be mounted on the fuel nozzle of the at least one fuel dispenser for identifying the at least one fuel dispenser of the fuel supply source, the automotive information module means including means adapted to acquire, process, store and communicate dispenser specific data obtained from said RF identification tag means; and d) means for establishing an RF data communications link between the automotive information module means and the fuel management unit means for supplying vehicle specific identification data and dispenser specific data to the fuel management unit whereby the fuel management unit means controls dispensing from the at least one fuel dispenser of the fuel supply source based upon the vehicle specific data and dispenser specific data received thereby.

2. The system of claim 1, including software means for processing and reporting data with respect to fueling from the at least one fuel dispenser of the fuel supply source to the fuel management unit means.

3. The system of claim 2, wherein the software means is located at a location remote from the fuel supply source.

4. The system of claim 1, wherein the fuel management unit means comprises:

a) an RF receiver for the reception of the RF data from an RF transmitter of the automotive information module means;

b) a first microcontroller including:

means for communicating with and controlling electronic fuel dispenser control means located at the fuel supply source;

means for compiling and storing data with respect to fueling transactions;

means for receiving and storing data with respect to fueling authorizations;

means for receiving via the RF receiver the vehicle specific data and dispenser specific data;

means for authorizing and initiating a fueling sequence; and means for monitoring the reception of data from the RF transmitter of the automotive information module means to determine the removal of the fuel nozzle from the fuel filler neck of the vehicle to terminate the fueling transaction sequence and record a fuel transaction record.

5. The system of claim 4, including means to enable the fuel management unit means to function with fueling control and authorization systems selected from the group consisting of key, card, and no-key/no-card systems.

6. The system of claim 1, wherein the fuel management unit means includes means for controlling power and internal control systems of both electronic and non-electronic fuel dispensers.

7. The system of claim 4, wherein the RF identification tag means comprises:

a) an RF identification tag; and b) means for positioning the RF identification tag relative to the fuel nozzle of the vehicle such that the tag is readable by the automotive information module means only when the fuel nozzle is inserted into the filler neck, and the dispenser specific data being stored in the first microcontroller of the fuel management unit to enable referencing of the dispenser specific data during fueling authorization.

8. The system of claim 7, wherein the automotive information module means comprises:

a) a second microcontroller including:

means to communicate with and receive dispenser specific data from the RF identification tag only when the fuel nozzle is received in the filler neck of the vehicle;

means to communicate with and receive mileage data from the vehicle;

means to receive, compile and store the vehicle specific data including vehicle identification, fuel supply source data, fuel types and quantity limits from a data source; and means to communicate, via the RF transmitter, the vehicle specific data and the dispenser specific data to the RF receiver of the fuel management unit means.

9. The system of claim 8 wherein said means to communicate with and receive dispenser specific data includes an interrogation circuit including an antennae adapted to be mounted to the filler neck of the vehicle.

10. The system of claim 9 including a third microcontroller for inputting vehicle specific data into said second microcontroller.

11. A fuel dispensing control, authorization and accounting system which operates without requiring control and authorization input from an individual during the fueling of a vehicle at a fuel supply source, the fuel supply source including at least one fuel dispenser, each fuel dispenser including a fuel dispensing hose and an attached fuel nozzle, and the vehicle having a fuel filler neck of a size to receive a fuel nozzle, the system comprising:

a) a microcontroller-based fuel management unit means adapted to be operatively connected to the fuel supply source to control fuel dispensing from the at least one fuel dispenser, the fuel management unit means also including a RF receiver;

b) a microcontroller-based automotive information module means adapted to be mounted to a vehicle for storing and transmitting vehicle specific identification data;

c) a passive RF identification tag means including dispenser specific data adapted to be mounted on the fuel nozzle of the at least one at least one fuel dispenser for identifying said at least one fuel dispenser;

d) the automotive information module means including interrogation circuit means adapted to acquire dispenser specific data from said RF identification tag means; and e) the automotive information module means including an RF transmitter adapted to establish an RF data communications link between the automotive information module means and the fuel management unit means for supplying vehicle specific identification data and dispenser specific data to the fuel management unit means, the fuel management unit means being adapted to control dispensing from the at least one fuel dispenser of the fuel supply source based upon the vehicle specific data and dispenser specific data transmitted thereto.

12. The fuel dispensing system of claim 11, including means for connecting said automotive information module means to a battery source in the vehicle.

13. The fuel dispensing systems of claim 11 wherein said interrogation circuit means includes an antennae adapted to be carried by the vehicle fuel filler neck.

* * * * *